T. J. FEGLEY & G. O. LEOPOLD.
SHEARS.
APPLICATION FILED JULY 28, 1917.
1,266,784.
Patented May 21, 1918.
2 SHEETS—SHEET 1.
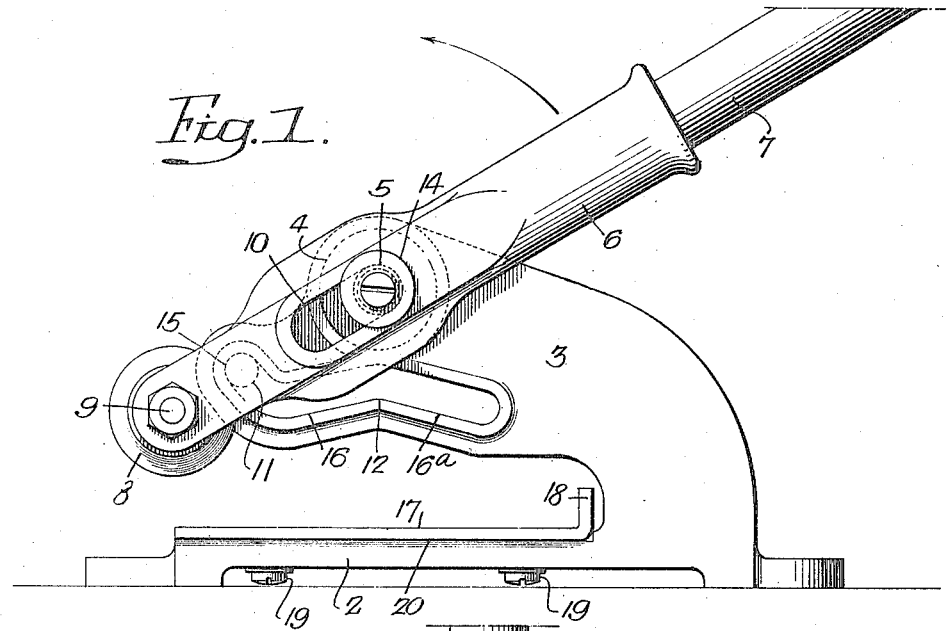
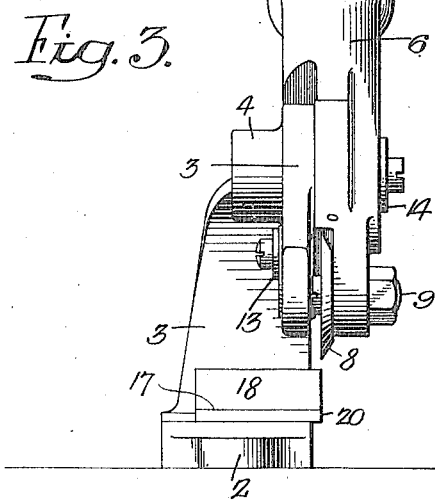
Inventors.—
Thomas J. Fegley,
George O. Leopold.
by their Attorneys

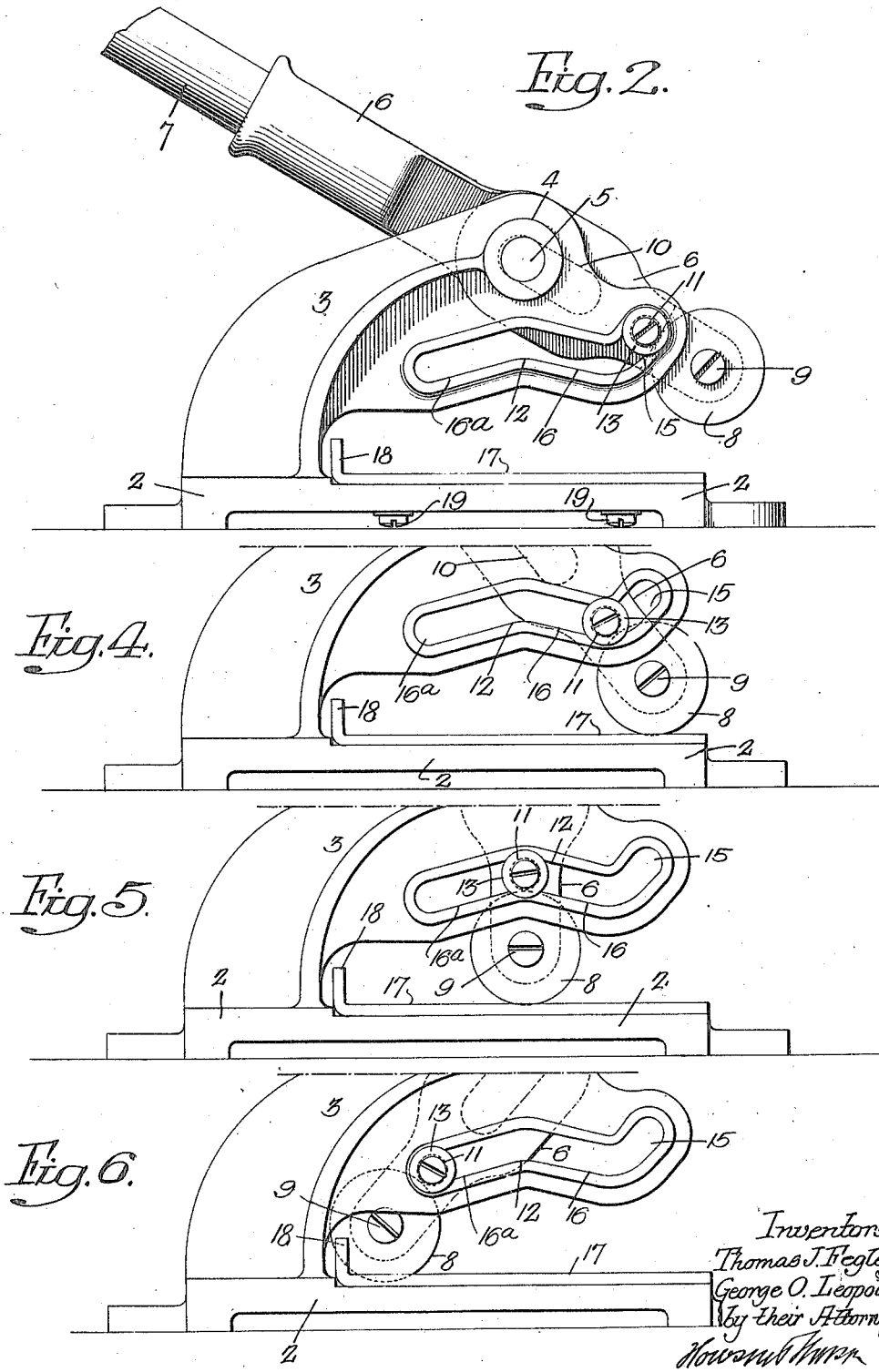

UNITED STATES PATENT OFFICE.

THOMAS J. FEGLEY AND GEORGE O. LEOPOLD, OF PHILADELPHIA, PENNSYLVANIA, ASSIGNORS TO NORTH BRO'S M'F'G. CO., OF PHILADELPHIA, PENNSYLVANIA, A CORPORATION OF PENNSYLVANIA.

SHEARS.

1,266,784.   Specification of Letters Patent.   Patented May 21, 1918.

Application filed July 28, 1917. Serial No. 183,288.

*To all whom it may concern:*

Be it known that we, THOMAS J. FEGLEY and GEORGE O. LEOPOLD, citizens of the United States, and residents of Philadelphia, county of Philadelphia, State of Pennsylvania, have invented certain Improvements in Shears, of which the following is a specification.

Our invention relates to certain improvements in shears in which a rotary knife acts in conjunction with a straight blade.

One object of our invention is to design the shears so that a clean cut can be made with considerable power.

Another object of the invention is to design the shears so that the blade will travel in a horizontal plane while its carrier, or lever, is turned on a pivot.

In the accompanying drawings:

Figure 1 is a view of one side of our improved shears, showing the cutter in the raised position;

Fig. 2 is a view of the side opposite to that illustrated in Fig. 1;

Fig. 3 is an end view; and

Figs. 4, 5 and 6 are diagram views illustrating our invention.

Referring to the drawings, 2 is the base and projecting from the base is an overhanging support 3 for a bearing 4 on which is mounted a pivot pin 5 for a lever 6 having a handle 7 carrying at one end a rotating circular knife pivoted on a bolt 9 projecting from the handle 6. The handle 6 has a slot 10 through which extends the pivot 5, which is rigidly held to the bearing 4 so that the lever not only rotates on the pivot 5, but also slides longitudinally thereon, due to the travel of the pin 11 in a cam slot 12 in the support 3, as clearly shown in Fig. 1. The pin 11 projects from the lever, as shown, and a washer 13 on this pin, as well as a washer 14 on the pin 5, holds the lever and its knife in the proper cutting position laterally. It will be noticed that the slot 12 is irregular and has a portion 15 which raises the knife 8 clear of the bed, an inclined portion 16, and a reversed inclined portion 16ª. The inclined portions are so shaped as to cause the knife to travel parallel with the face of a plate 17 which is mounted on the bed 2. The plate has a flange 18 at one end and is secured to the base by screws 19. One edge of the plate 20 extends beyond the side of the base 2 and forms a cutting edge for the fixed knife with which the blade coacts.

In Fig. 1, the blade is shown in the raised position so that the work can be placed on the plate 17. Then the lever is turned in the direction of the arrow, Fig. 1, by engaging the handle 7 and the rotating blade 8 comes in contact with the work until it assumes a position, as in Fig. 4, where the lower edge is slightly below the upper edge of the bed plate. Then, as the movement of the lever is continued, the blade travels horizontally with respect to the base, due to the shape of the portion 16 of the cam slot 12. When in the vertical position, as in Fig. 5, the blade holds the same relation to the base and when the pin 11 is traveling in the portion 16ª of the slot, the cutter bears the same relation to the bed plate so that, while the lever is turned on its pivot, the rotating cutting knife travels in a line parallel with the face of the bed plate.

We claim:

1. The combination in a base, of a support carrying an overhanging bearing and having an irregular cam slot therein; a lever pivoted to the bearing and having a pin adapted to travel in the cam slot; and a rotating blade mounted on the lever and adapted to coact with the base as it is guided by the cam slot to cut material mounted on the base.

2. The combination of a base; a bed plate thereon, one edge of the bed plate forming the lower fixed blade of the shears; a support projecting upwardly from the base; a pin mounted on the support; a lever having a slot therein through which the pin projects; a pin on the lever, the support having an irregular cam slot into which the pin extends; a rotating blade carried by the lever and coacting with the fixed blade, the cam slot being so formed that the rotating blade will travel parallel with the face of the bed plate as the lever is turned.

3. The combination of a base; a support carrying an overhanging bearing; a pin projecting from the support; a lever having a slot therein; a pin on the support extending through the slot; a cam slot in the support below the pin; a pin on the lever projecting into the cam slot; a rotating blade mounted on the lever, the cam slot being so formed as to cause the rotating blade to move parallel with the face of the base.

4. The combination of a base; a bed plate thereon; an overhanging support projecting upward from the base; a pin on the support; a lever having a slot therein, the pin on the support extending through the slot; a cam slot in the support having two reversed inclined portions and an abrupt portion at one end; a rotating blade mounted on the lower end of the lever, the cam slot being such that when the lever is turned the blade will be first moved toward the base and will travel parallel with the upper face of the base.

In witness whereof we affix our signatures.

THOMAS J. FEGLEY.
GEORGE O. LEOPOLD.

Copies of this patent may be obtained for five cents each, by addressing the "Commissioner of Patents, Washington, D. C."